United States Patent [19]

Zimmerman

[11] Patent Number: 4,706,223
[45] Date of Patent: Nov. 10, 1987

[54] METHOD FOR DETERMINING THE POSITION OF A SUBTERRANEAN REFLECTOR FROM A TRAVELTIME CURVE

[75] Inventor: Carol J. Zimmerman, Houston, Tex.

[73] Assignee: Exxon Production Research Company, Houston, Tex.

[21] Appl. No.: 891,832

[22] Filed: Aug. 1, 1986

[51] Int. Cl.[4] ............................................ G01V 1/00
[52] U.S. Cl. ...................................... 367/38; 367/53; 367/57; 367/37
[58] Field of Search ....................... 367/27, 37, 38, 40, 367/53, 57, 33; 33/304; 364/421

[56] References Cited

U.S. PATENT DOCUMENTS

| | | | |
|---|---|---|---|
| Re. 21,183 | 8/1939 | Blau | 367/53 X |
| 3,127,585 | 3/1964 | Alexander et al. | 367/53 X |
| 4,241,429 | 12/1980 | Bloomquist et al. | 367/53 X |
| 4,359,766 | 11/1982 | Waters et al. | 364/421 X |

OTHER PUBLICATIONS

Chun, J. H., et al., "Three Dimensional Dip Analysis of Offset VSP Data," Paper Presented at 53rd Annual Meeting of the Society of Exploration Geophysicists, Las Vegas, Nev., Sep. 11-15, 1983.
Kennett, P., et al., "Vertical Seismic Profiles: Their Applications in Exploration Geophysics," Geophysical Prospecting, 1980, V. 28, pp. 676-699.

Primary Examiner—Charles T. Jordan
Assistant Examiner—John W. Eldred
Attorney, Agent, or Firm—Alfred A. Equitz

[57] ABSTRACT

A method for determining the position of a subterranean plane reflector relative to a known location on the earth surface from unprocessed seismic data received at a number of colinear acoustic receiver locations. A traveltime curve associated with the reflector is identified from the seismic data. From two points on the traveltime curve, a signal indicative of the reflector's dip angle is generated. Using the dip angle signal, signals indicative of the position of each imaged point of the reflector are generated. The inventive method assumes knowledge of the average velocity of seismic waves in the subterranean formation above the reflector, and that such formation region can adequately be considered to have constant velocity equal to such average velocity. The method may be applied to process raw data generated during a vertical seismic profiling operation. More generally, the invention may be applied to process raw data generated during any seismic prospecting operation in which seismic data is received at approximately colinear receiver locations in a plane, after the associated seismic waves have originated at a source located anywhere in the same plane. In a preferred embodiment, a nonlinear optimization technique is used to generate the desired signals using all points on the traveltime curve as input, rather than only two points.

13 Claims, 3 Drawing Figures 4,706,223

METHOD FOR DETERMINING THE POSITION OF A SUBTERRANEAN REFLECTOR FROM A TRAVELTIME CURVE

FIELD OF THE INVENTION

This invention relates in general to seismic prospecting methods. More particularly, it relates to seismic prospecting techniques in which a source of seismic energy and an array of colinear acoustic receivers are operated to generate a gather of seismic traces, and the position of a subterranean plane reflector is determined from the seismic traces.

BACKGROUND OF THE INVENTION

It is conventional in seismic prospecting to employ an array of colinear acoustic receivers. For example, in one conventional seismic prospecting technique, a single seismic source (such as an explosive source in a shallow shot hole or a seismic vibrator) and a number of acoustic receivers are disposed substantially colinearly on the earth's surface. Alternatively, in the class of conventional techniques known as vertical seismic profiling (VSP), a receiver is positioned at a number of locations (depths) in a borehole, spaced along the borehole axis. A seismic source is fired and the signal is recorded at each geophone position. A VSP technique wherein a seismic source is positioned at (or near) the intersection of the borehole and the earth surface, is known as a "zero-offset VSP" technique. A VSP technique wherein a seismic source is positioned at (or near) the earth surface, but horizontally offset from the borehole, is known as an "offset VSP" technique.

Conventional seismic prospecting techniques may be employed to determine the position of a planar subterranean reflector. Throughout this application it will be assumed that the "strike" of each referenced planar reflector (the direction of the intersection of the reflector and a horizontal plane) is known, and that it is desired to determine the dip angle of the reflector, the depth (vertical distance) below the earth surface of the reflector at a particular point relative to a known position on the earth surface (such as the mouth of a borehole), and more importantly, the position of each reflection point that is represented on the seismic record. The term "imaging" the reflector will be used herein to denote determining the position of each point on the reflector that is represented on the seismic record.

In seismic prospecting, acoustic signals received at each of a number of acoustic receivers are typically recorded after these signals have propagated away from a common source location through a subterranean earth formation. Most commonly, a single seismic signal propagates away from the source as a result of a single event of operation ("shot") of the source, and each recorded acoustic signal possesses a portion of the wave energy resulting from the single shot. Alternatively, each recorded signal may be associated with a different shot, where each shot occurs at the same source location.

The recorded signals associated with a single source location but with different receiver locations will be denoted in this Specification collectively as a single shot gather of seismic traces. The receiver locations are assumed to be colinear or approximately so. In accordance with conventional techniques, the traces in the gather are displayed side-by-side as a "seismic section" (or "seismic record"). Reflection signals along the traces associated with the same subterranean reflector will fall along a generally hyperbolic curve known as a traveltime curve that may sometimes be identified by visual inspection of the seismic section.

Conventional methods for determining the actual subsurface position of a reflector from the gather of traces have required that the apex of the hyperbolic traveltime curve be identified. The present invention eliminates the need to identify the apex of any traveltime curve. Instead, the invention enables determination of the dip of a plane reflector, and the reflector's position along a line of receiver locations, from any two or more points on the traveltime curve. The inventor has recognized that these two parameters are the identifying characteristics of any seismisc reflector from which the position of each reflection point which is represented on the seismic record may be calculated with respect to a user-chosen coordinate system. The invention permits use of a reduced data set, resulting in considerable reduction in data collection and processing time and expense, relative to conventional techniques. Because data processing in accordance with the invention is so simple, it is anticipated that the invention will enable real-time processing and interpretation to be done in the field.

SUMMARY OF THE INVENTION

The invention is a method for determining the position of a subterranean phase reflector, relative to a known location on the earth's surface, from unprocessed seismic data (such as a single shot gather of seismic traces) received at a number of acoustic receiver locations. A traveltime curve associated with the reflector is identified from the data. From any two points on the traveltime curve, the reflector's dip angle is determined, assuming knowledge of the average velocity of seismic waves in the subterranean formation above the reflector. It is further assumed that the velocity of seismic waves in the subterranean formation above the reflector may be considered to be substantially constant and equal to the average velocity mentioned in the previous sentence. The depth of the reflector at a known position (such as a wellhead) on the earth's surface, or the depth of the reflector's projection to an axis intersecting the known position (which axis may coincide with a well axis), is calculated from the dip angle. From the dip angle and the depth of the reflector at the known position, the position of each point on the reflector associated with each point on the traveltime curve is determined, assuming knowledge of the source location and the receiver locations associated with the traveltime curve.

In each embodiment of the invention, the seismic data to be processed (such as the traces in a gather) are associated with a single source location and with a number of approximately colinear receiver locations whether or not the receiver locations lie within a well or along the surface of the earth. The source and receiver locations all lie approximately in a single plane across the strike axis of the reflector.

DETAILED DESCRIPTION OF THE PREFERRED EMBODIMENTS

The rectangular coordinate system (x, z) used herein is defined in the vertical plane (y=0) perpendicular to the reflector's strike. The coordinate x is positive in the direction updip of the origin. The earth's surface is located at z=0, and the coordinate z is negative below the earth's surface. The dip angle, $\theta$, of the reflector is defined to be positive in the counterclockwise direction. In embodiments of the invention wherein acoustic receivers are disposed in a vertical borehole, the vertical line x=0 will be defined to coincide with the borehole's longitudinal axis, so that the mouth of the borehole, at the earth's surface, will be located at the origin (0, 0). The parameter, P, a negative number, is defined to be the depth at which the plane defined by the reflector intersects the borehole's longitudinal axis.

Figure 1:
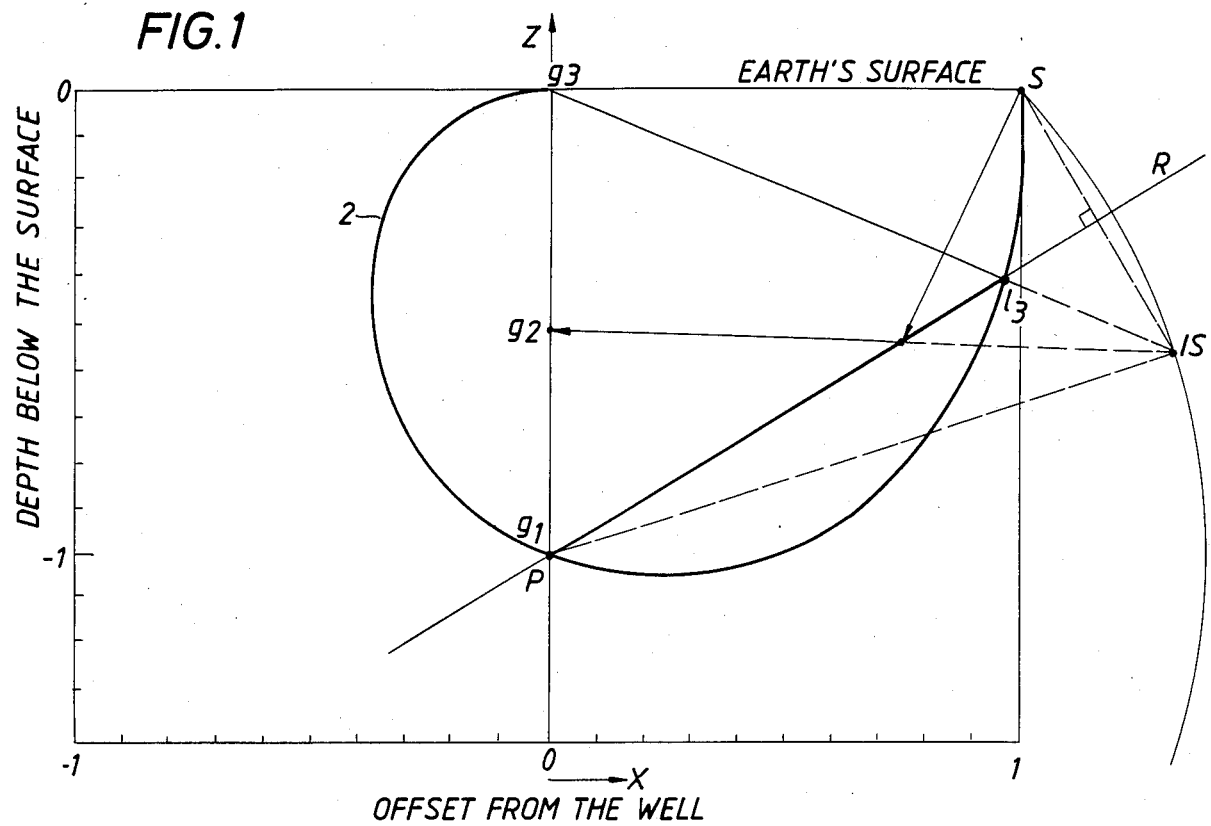
FIG. 1 is a diagram showing the two-dimensional region that may be imaged by a seismic signal originating at source S and received by receivers in a borehole having longitudinal axis $x=0$ in the $(x, z)$ plane. The distance units in the x and z directions are determined by normalizing the offset distance (x=S) of source S relative to the borehole, to the depth (P) at which reflector R intersects the borehole axis.

For simplicity, the invention will initially be described with reference to seismic data generated during a VSP operation employing the source and receiver array shown in FIG. 1. Source S of FIG. 1 is located on the earth surface (z=0) at point (S, 0). Three acoustic receivers are located in a borehole (having longitudinal axis x=0) at points (0, $g_1$), (0, $g_2$), and (0, $g_3$). The uppermost receiver is positioned at the mouth of the borehole (also referred to as the "wellhead") so that $g_3=0$. The lowest receiver is positioned at depth z=$g_1$=P. The image source IS corresponding to source S is positioned below reflector R at an equal distance along the perpendicular to the reflector from the source since the source lies above the reflector. If one imagines a mirror coinciding with the reflector, the image source would then be the location of the "reflection" of the source in the mirror. The true path of the sound signal from the source to the reflector to the receiver has the same length (and thus the same travel time) as the path from the image source to the reflector to the receiver, but the image path is straight rather than segmented (eg., travel path from S to $G_2$ and from IS to $G_2$ in FIG. 1), thus simplifying the calculations. The notion of the image source is well-known in seismic literature. However, the method of ray-trace inverse modeling in accordance with the invention is novel in that it relies upon finding the coordinates of the image source from which all other parameters are derived.

The locus of all image sources associated with any plane reflector intersecting the borehole axis at point (O, P) is the circle centered at point (O, P) and having radius equal to the distance between (O, P) and (S, O). For any receiver in the borehole, the point on the reflector that is imaged lies along the line from the image source to the receiver. Thus, the farthest point from the borehole that can be imaged ($l_3$) is imaged by the receiver at (O, $g_3$). The boundary of the area that can be imaged is the curve identified by reference numeral 2.

Although three receivers are shown in FIG. 1, it should be understood that two or more vertically separated receivers may be employed, and that data to be processed may be received at more than or less than three receiver positions. From the unprocessed seismic data received at each receiver location, a traveltime line associated with an imaged plane reflector is identified according to techniques well known in the field of seismic data processing. The traveltime line includes, for each received signal associated with one of the receiver locations, a point indicative of the arrival time of the energy in the received signal reflected from the imaged reflector.

If the velocity V of the reflected signals associated with the traveltime curve is approximately known, then the dip angle of the reflector may be determined from any two points ($t_a$, $g_a$) and ($t_b$, $g_b$) on the traveltime curve using the relationship $$\theta = \arctan((XI_I - S)/Z_I), \quad (1)$$

where ($X_I$, $Z_I$) are the coordinates of the image source determined using the following relationships:

$$DZ_I = ((t_a^2 - t_b^2)V^2 - (g_a^2 - g_b^2))/(-2(g_a - g_b)) \quad (2)$$

and $$X_I = (t_a^2 V^2 - (Z_I - g_a)^2)^{\frac{1}{2}} \quad (3)$$

In relationships (1)-(3), it is assumed that $g_a$ is the depth (a negative number) of the deeper of the two receiver locations, and $g_b$ is the depth (also a negative number) of the shallower receiver location. The positive square root is taken in relationship (3).

Relationships (1)-(3) require use of only two arbitrary points from the traveltime curve corresponding to the same reflecting horizon. However, to obtain greater precision, it is contemplated that one may alternatively determine estimates of the values $X_I$ and $Z_I$, by using a set of arbitrary noncoincident receiver positions (O$g_c$) for every point ($t_i$, $g_i$) on the traveltime curve in a nonlinear (least squares) optimization technique. In particular, the following equation can be solved for the reference values of $X_I$ and $Z_I$ using a nonlinear least square method: $d^2_j = (Z_I - z_j)^2 + X^2_I$, where $d_j = Vt_j$. This alternative procedure results in the "best" estimate for the values of $X_I$ and $Z_I$ that can be computed from the seismic data, by using the distance formula in cartesian coordinates between the image source position ($X_I$, $Z_I$) and an arbitrary receiver location (O$z_{gj}$) for every point on the traveltime curve in a nonlinear (least squares) optimization technique. Such best estimated values of $X_I$ and $Z_I$ may be inserted into relationship (1) to determine the dip angle $\theta$.

For a given reflector, the depth point P at which the reflector intersects the well axis is the same regardless of the source offset, the velocities of the acoustic arrivals, or the curvature of the reflected arrivals. In many circumstances, such as if the reflector terminates before it reaches the well, or if no data were acquired from receiver locations at depths of at least P in the well, the point P may not be directly identifiable from the record using conventional techniques. However, the inventor has found that P may be determined from a traveltime curve using the following relationship:

$$P = (X_I - S \cos(2\theta))/-\sin(2\theta) \quad (4)$$

or, equivalently, using the following relationship:

$$P = (Z_I - S \sin(2\theta))/(1 + \cos(2\theta)). \quad (5)$$

Alternatively, given that the dip angle $\theta$ has been determined previously, P may be determined from any point $(t_d, g_d)$ on the traveltime curve as follows:

$$P = (g_d - S \tan\theta)/2) + (2\cos\theta)^{-1}(-S^2\cos^2\theta + Sg_d\sin\theta(4\cos\theta - \sin\theta) + t_d^2 V^2 - g_d^2\sin^2\theta)^{\frac{1}{2}} \quad (6)$$

Having determined P and $\theta$, it is within the scope of the invention to determine the coordinates of each point $(X_R, Z_R)$ on the reflector which is imaged at a corresponding receiver location $(O g_e)$, which receiver location is in turn associated with the traveltime curve, using the relationship:

$$X_R = ((P - g_e)X_I) / ((Z_I - g_e) + X_I \tan(\theta)) \quad (7)$$

and $$Z_R = X_R \tan(\theta) + P \quad (8)$$

The locations of the reflection points $(X_R, Z_R)$ are dependent only upon $\theta$, P, S, and $g_e$ since $X_I$ are $Z_I$ are also functions of these variables. Assuming S and $g_e$ are known accurately, the accuracy of $X_R$ and $Z_R$ depend upon the accuracy of the previous determinations of $X_I$, $Z_I$, $\theta$ and P from the traveltime curve, i.e., upon the accuracy of the reflection time picks used in relationships (1)-(3).

The solutions (7) and (8) are not dependent upon any particular source offset position, nor are they dependent upon the visibility of any particular portion of the traveltime curve on the record. Increasing (above two) the number of reflection times that are incorporated into the calculations (such as by employing the nonlinear optimization technique mentioned above) will increase the accuracy of the estimates of $\theta$ and P. If $\theta$ and P (and S and $g_e$) are known exactly, the inventive method determines the reflection points $(X_R, Z_R)$ exactly in the case that the subterranean formation has constant velocity above the reflector. No particular source placement is necessary to perform the method, but proper source placement results in easier determination of the traveltime curve, especially for the portions of the curve associated with the deeper receivers, because proper source placement renders the reflections (reflected arrivals) more easily distinguishable from the direct arrivals.

The preferred source position for offset VSP operations is that at which the image source lies at the same depth as P, with the resulting advantages that a long length of the reflector is imaged, all the reflected arrivals are upgoing events, and also, that there is good separation between the direct and reflected arrivals.

To bring the image source to the same depth as P so that the portion of the reflector located updip of the well may optimally be imaged, the source must be moved updip (to raise the image source) for shallow-dipping reflectors, and downdip (to lower the image source) for steeply-dipping reflectors. The equation which describes quantitatively how far the source must be offset from the well is $$S = -P \operatorname{ctn}(2\theta), \quad (9)$$

where S is the source offset distance, P is the depth of the reflector at the well, and $\theta$ is the reflector dip. S has positive magnitude at locations updip of the well and negative magnitude at locations downdip of the well. The image source should not be caused to move to a position shallower than P if one wishes to preserve the upgoing character of the reflected arrivals for the entire imaged portion of the traveltime curve.

For reflectors having a dip angle of less than 45 degrees, a portion of the reflector which lies downdip of the well can also be imaged if one places the source downdip farther than $$S = P \tan(2\theta). \quad (10)$$

This equation describes the source offset location which will move the image source location to the downdip side of the well.

One may move the source as far downdip as wished to image a longer length of the reflector downdip from the well while still keeping the reflected arrivals as upgoing events on the VSP record. But imaging downdip of the well is practical only for dips having angle less than 40 degrees, since the values of $\tan(2\theta)$ increase rapidly as $\theta$ increases to approach 40 degrees.

Conventional techniques exist for storing the raw seismic data to be processed in accordance with the inventive method in either digital or analog form, and for converting the data between digital and analog form. It is within the scope of the invention to process the raw seismic data in either digital or analog form.

Because the inventive method requires processing of only two points on a traveltime curve, the invention may conveniently be performed in the field during seismic data acquisition operations, without the need for complicated and time-consuming data processing that can usually be performed practically only at a computer center removed from the data acquisition location. For example, a first set of VSP data may be quickly processed in accordance with the invention by a user in the field, and the resulting information regarding a subterranean reflector then used to help determine the optimal source and receiver locations for acquiring a second set of VSP data. Thus, the invention advantageously eliminates the need to acquire an unnecessarily large amount of data at numerous source and receiver locations, and then process all the data at a later time, discarding that subset of the data which is unnecessary for imaging a reflector of interest. Rather, the invention permits minimization of the amount of data that must be acquired to image a reflector of interest.

In a preferred embodiment, the raw data is processed in digital form, and the data processing steps of the inventive method are translated into a series of computer instructions in a manner that will be apparent to those ordinarily skilled in the art of seismic data processing. In this preferred embodiment, the traveltime curve, the source and receiver positions, and the signal velocity V will be translated into digital signals. A digital signal representing $\theta$ will be generated from the raw signals by operating on the raw signals using software implementations of the algorithm described with reference to relationships (1)-(3). A digital signal representing P will also be generated by operating on the raw signals and the $\theta$ signal using software implementations of the relevant algorithms described above.

It is contemplated that any or all of the raw data, the signals produced as end products of the inventive method, and the signals produced during performance of the method, may be displayed in any conventional manner. Alternatively, any or all of such data and signals may desirably be subjected to further processing instead of being displayed, or in addition to being displayed.

The inventive method processes raw VSP data to determine the position relative to a known position on the earth surface (such as the position of a seismic source or wellhead) of that portion of a plane reflector imaged by the raw VSP data. Since any subterranean structure can be approximated to be the summation of a number of plane reflectors having different dips ($\theta$) and depths (P), repeated performance of the inventive method determines the solution to the inverse problem of modeling subterranean structure from raw VSP data.

Figure 2:
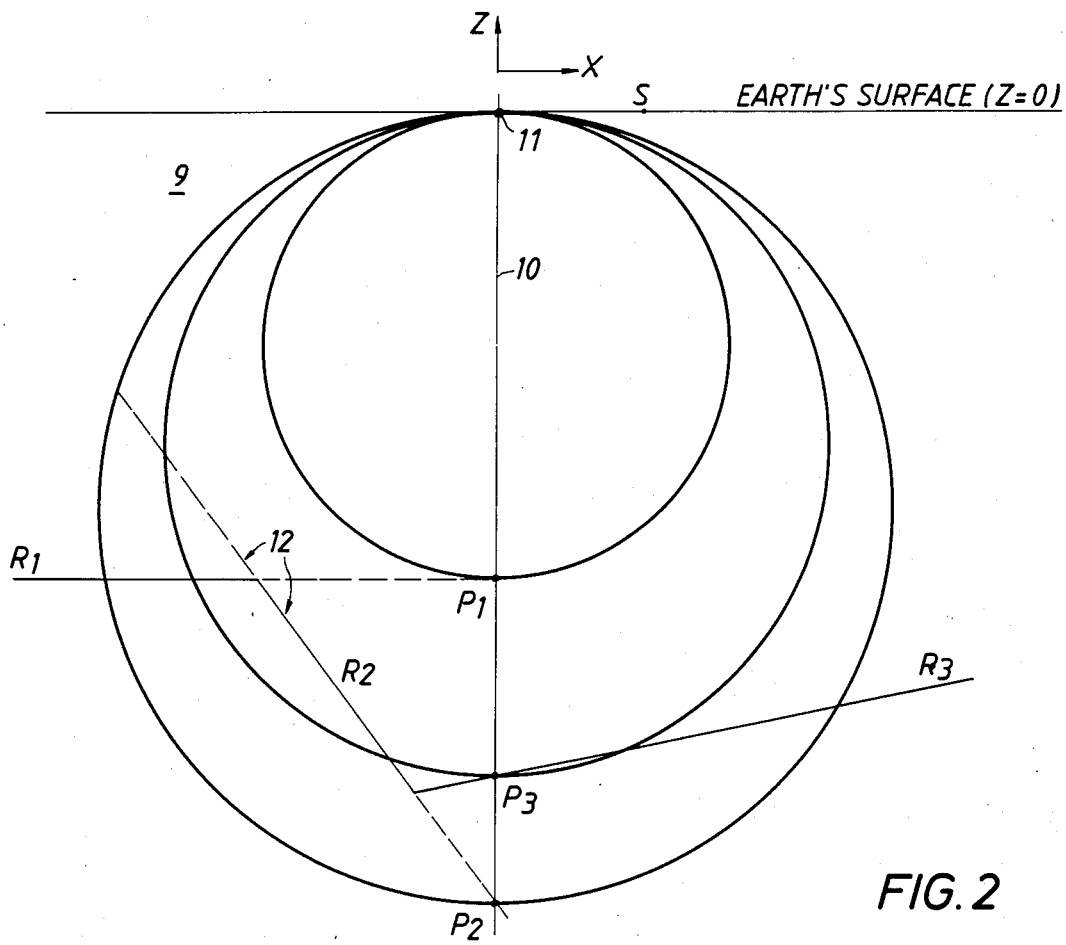
FIG. 2 is a cross-sectional view of a subterranean earth formation with a reflector having three planar sections, $R_1$, $R_2$ and $R_3$.

An example in which data generated during a zero-offset VSP operation is processed in accordance with the invention will next be described with reference to FIGS. 2 and 3. FIG. 2 is a cross-sectional view of subterranean formation 9 including a fault 12. A borehole having longitudinal axis 10 is drilled through the downthrown side of the fault. Formation 9 contains three reflecting interfaces: $R_1$, a planar surface on the upthrown side; $R_2$, a planar fault scarp with a 60 degree dip; and $R_3$, a planar surface on the downthrown side with a 5 degree dip. $P_i$ (for reflector $R_i$) is the point where axis 10 intersects the line which includes a segment coinciding with the intersection of reflector $R_i$ and the plane of FIG. 2. $P_1$ is $-(6000)$ ft., $P_2$ is $-(10,000)$ ft., and $P_3$ is $-(8500)$ ft. We shall assume that the reflectors $R_1$ and $R_3$ have been well imaged on a previously obtained seismic section because they have shallow dip. We shall assume it is desired to image $R_2$ by means of VSP.

In conducting the VSP operation, source S will preferably be located so as optimally to image the target reflector, $R_2$. The coordinate system (x, z) is defined as above with the origin (O, O) at wellhead 11. Since the X coordinate is positive to the right of wellhead 11, $R_2$ has a negative 60 degree dip and $R_3$ has a positive 5 degree dip. We shall assume that, by interpreting previously obtained data, the dip of $R_2$ has been estimated to be negative 50 degrees and its depth at the well to be $-(9,500)$ ft. It will become apparent that the erroneous estimate of the dip and depth of $R_2$ will not significantly affect the accuracy of the end product of the inventive method, even if the source is placed non-optimally. Equation (9) is used to find the optimal source offset position for the estimated values of dip and reflector depth. Equation (9) specifies that the source should be positioned 1710 ft. downdip of the well, with "downdip" being defined by the estimated position of $R_2$. This optimal source position will be updip of the well for reflector segment $R_3$.

Figure 3:
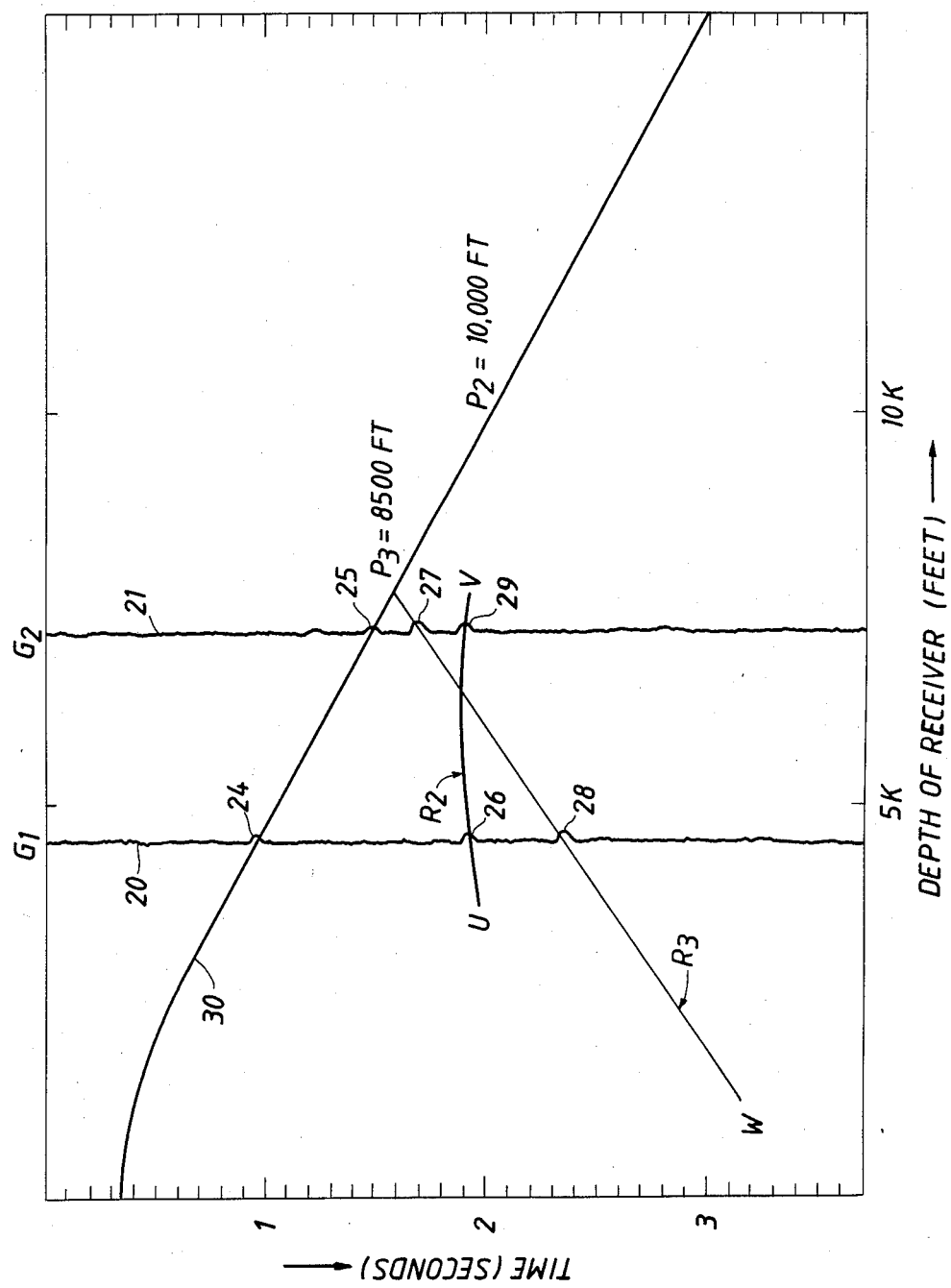
FIG. 3 is a simplified representation of a VSP record of the type that may be processed in accordance with the invention to determine the position of reflector $R_2$ of FIG. 2.

As a result of performing the VSP operation, one obtains the result shown in FIG. 3. FIG. 3 is a VSP record, from which all but two individual traces (traces 20 and 21) have been deleted for simplicity. Increasing distance to the right of FIG. 3 represents increasing magnitude of receiver depth. Increasing distance toward the bottom of FIG. 3 represents increasingly late arrival time. Trace 20 represents the acoustic signal received at receiver $G_1$ (positioned at depth $g_1$ in the well). Trace 21 represents the acoustic signal received at receiver $G_2$ (positioned at depth $g_2$ in the well). Local amplitude maxima 24 and 25 of traces 20 and 21, respectively, represent the arrivals of seismic energy propagating directly from the source. From these data points, and others from the traces not shown in FIG. 3, direct arrival curve 30 is determined. Local amplitude maxima 26 and 29 of traces 20 and 21 (and other data points from the traces not shown in FIG. 3) determine the traveltime curve having endpoints U and V associated with reflected seismic arrivals from reflector $R_2$. Similarly, local amplitude maxima 28 and 27 of traces 20 and 21 (and other data points from the traces not shown) determine the traveltime curve having endpoints W and $P_3$ associated with reflected seismic arrivals from reflector $R_3$. Not only is $R_2$ apparent from FIG. 3 (in the sense that the associated traveltime curve is determined), but also part of $R_3$ is apparent, even though the source position has been chosen to be optimal for imaging $R_2$. The dips of the reflectors $R_2$ and $R_3$ are determined from any two points on traveltime curve UV (such as point 26 and point 27) and from an estimate of the velocity of the associated seismic waves, using relationships (1)–(3). The result is that $\theta_2$ is determined to be $-60$ degrees and $\theta_3$ is determined to be 5 degrees. In an alternate preferred embodiment of the invention, for each reflection hyperbola all the available data from FIG. 3 would be employed using a nonlinear least square method in the manner described above to determine $\theta_2$ and $\theta_3$. From relations (2) and (3), the coordinates of the image source are determined to be $X_I = -176,481$ feet and $Z_I = -9515$ feet for $R_2$, and $X_I = -165,743$ feet and $Z_I = 3160$ feet for $R_3$.

Notice that because $\theta_2$ is negative 60 degrees, in effect, our choice of coordinate system is different for $R_2$ than for $R_3$. This should be understood in order to obtain a correct result. If S is measured positive updip from the well, then for $R_2$, S is negative; but for $R_3$, S is positive since the two reflectors dip in opposite directions. If we use S as a positive number for both reflectors $R_2$ and $R_3$, the dip angle is measured clockwise for $R_2$ and is a negative number, but is measured counterclockwise for $R_3$, and is a positive number.

The reflector depth of $R_3$ at the well ($P_3$) happens to be readable directly from the traveltime curve as the depth, $-8500$ feet, where traveltime curve $WP_3$ intersects direct arrival curve 30. But reflector $R_2$ terminates within the viewing field and the reflected arrivals indicated by traveltime curve UV stop before they meet direct arrival curve 30. Consequently, conventional techniques do not determine $P_2$, and instead the inventive method should be performed to determine $P_2$. Performing the variation on the inventive method using relationships (1)–(4), $P_2$ is determined to be $-10,000$ feet.

Finally, for every point on traveltime curve UV (ie., for each receiver location associated with curve UV), we may calculate the coordinates of the point ($X_R$, $Z_R$) of $R_2$ that is associated with that receiver location. Only one of these calculations is shown below. For the receiver position, $G_1$, having depth $-4500$ ft., the reflected arrival time associated with $R_2$ is identified to be 1.95 s. Substituting these values into relationships (7) and (8), we determine the coordinates of the reflection point on $R_2$ recorded at $G_1$ to be:

$X_R = -2744$ feet and $Z_R = -5247$ feet.

Again we must be sure to adhere to our coordinate system convention to ensure that the signs of $X_R$ and $Z_R$ are correct. By repeating the above process for every point on traveltime curve UV, reflector $R_2$ is mapped.

Even though the dip and depth of $R_2$ were initially wrongly estimated when we chose our source offset, the inventive method enabled accurate determination of the correct position of $R_2$. If we had estimated the dip and depth of $R_2$ correctly, as negative 60 degrees and $-10,000$ feet, the source would optimally have been placed 5773 feet downdip of the well from $R_2$, quite a bit farther than the 1710 feet determined above. However, the inventive method would have determined the same values for $\theta_2$, $\theta_3$, and $P_2$, even though the respective image sources would not be in the same places and the segments of the reflectors we would have imaged would not have been the same. Incorrect results are not obtained by misplacing the source. Each source offset position is adequate to image a range of reflector dip angles. However, by optimally positioning the source, one maximizes the ability to separate the direct and reflected arrivals for the expected reflector dip and depth, and also ensures that the desired segment of the reflector is imaged.

Not only may the invention be employed to process VSP data obtained using a source positioned at the same vertical elevation as the wellhead, but the inventive method may also be employed to process seismic data received at receiver locations spaced along a vertical axis in a vertical plane, after the received seismic waves have originated at a seismic source positioned anywhere in the same vertical plane. An example is the case where the earth surface is non-horizontal, so that even if the receivers are disposed in a well and the source is disposed on the earth surface away from the wellhead, the wellhead and the source will be located at different vertical elevations. In this class of embodiments, relationships (1)-(10) are employed with the understanding that in their coordinate system, the horizontal axis extending between the source (which is not necessarily positioned on the earth surface) and the line along which the receiver locations lie is taken to be $z=0$. Thus, use of relationships (1)-(10) in this translated coordinate system will determine the depth of the subterranean reflector relative to the horizontal plane of the source.

It is also within the scope of the invention to process seismic data that are not VSP data. For example, in one embodiment, the invention is employed to process seismic data received at a set of geophones disposed colinearly and horizontally on the earth surface after originating at a seismic source positioned on the earth surface colinearly with the geophones.

More generally, it is within the scope of the invention to process seismic data received at colinear receiver locations in a plane after the received waves have originated at a seismic source positioned anywhere in the same plane. In this general embodiment, the relationships (1)-(10) discussed above are employed with the understanding that their coordinate system is defined so that the z-axis ($x=0$) coincides with the line of the receiver locations, and the x-axis ($z=0$) is the axis which is coplanar with the receiver and source positions, and which is perpendicular to the z-axis ($x=0$) and intersects the source position. The quantity P is the distance along the z-axis ($x=0$) of the intersection of the z-axis and the plane defining the reflector. The angle, $\theta$, is defined to be positive in the counterclockwise direction relative to the x-axis ($z=0$).

Where the receiver locations and source location all lie along a horizontal line on the earth's surface, the z-axis ($x=0$) will be horizontal and the angle, $\theta$, determined by performing the inventive method will be $\theta = \phi - 90°$, where $\phi$ is the angle between the reflector's planar surface and a horizontal plane. Also in such configuration, the quantity P appearing in equations (1)-(10) will be the horizontal distance away from the source along the z-axis of the intersection point of the earth surface and the plane defining the reflector.

The angle, $\theta$, appearing in the equations (1)-(10) is denoted as the "dip angle" throughout this application, including the claims. The phrase "dip angle" is more commonly used in the field of seismic exploration to denote the angle between a subterranean planar reflector and a horizontal plane, which angle shall be identified by the symbol $\phi$ in this application. The relation between the angle $\theta$ appearing in equations (1)-(10), and the angle $\phi$ is $\theta = \phi - \alpha$, where $\alpha$ is the angle (positive in the counterclockwise direction) from a horizontal line (in the plane of the source and receiver locations) to the x-axis ($z=0$).

The foregoing description is merely illustrative of the invention. It is contemplated that various changes in the details of the methods described may be within the scope of the invention as defined by the appended claims.

I claim:

1. A method for processing seismic signals received at each of a number of approximately colinear acoustic receiver locations separated from each other along a first axis in a first plane after propagating from a seismic source located in the first plane through a subterranean earth formation, including the steps of:

(a) identifying from the seismic signals a traveltime curve associated with a subterranean plane reflector;

(b) generating a first signal indicative of the dip angle, $\theta$, of the plane reflector using the relationship $$\theta = \arctan((X_I - S)/Z_I)$$

where (S,0) are the coordinates of the seismic source and $(X_I, Z_I)$ are the coordinates of the image source corresponding to the seismic source, with $$Z_I = ((t^2_a - t^2_b)v^2 - (g_a^2 - g_b^2))/(-2(g_a - g_b)),$$

and $$X_I = (t^2_a v^2 - (Z_I - g_a)^2)^{\frac{1}{2}},$$

with $t_a$ = arrival time at a first receiver location of the reflected signal associated with the traveltime curve, $g_a$ = distance along the first axis of the first receiver location above a second axis, where the second axis lies in the first plane, is perpendicular to the first axis, and intersects the location of the source, $t_b$ = arrival time at a second receiver location of the reflected signal associated with the traveltime curve, $g_b$=distance along the first axis of the second receiver location above the second axis, and v=velocity of the reflected signal associated with the traveltime curve; and (c) determining the distance P, along the first axis above the second axis, of the point of intersection of the plane defined by the reflector and the first axis, using the relationship $$P = [(g_d - S\tan\theta)/2] + [(\tfrac{1}{2}\cos\theta)\cdot(-S^2\cos^2\theta +$$
$$Sg_d\sin\theta)(4\cos\theta - \sin\theta) + t_d^2 v^2 - g_d\sin^2\theta)^{\frac{1}{2}}], \text{ where}$$

$t_d$=the arrival time at a receiver location of the reflected signal associated with the traveltime curve, and $g_d$=the distance along the first axis, of the receiver location associated with $t_d$, above the second axis.

2. The method of claim 1, also including the step of: determining the position ($X_R$, $Z_R$) of the point on the reflector associated with the reflected signal received at the receiver location having depth ($-g_3$) along the first axis below the second axis, from the following relationships:

$$X_R=[(g_3-P)(-P\sin2\theta+S\cos2\theta)]/(g_3-2P-(S/\cos\theta))$$

and $$Z_R=X_R\tan(\theta)+P.$$

where $X_R$ is the distance along the second axis of the point ($X_R$, $Z_R$) from the first axis, and $Z_R$ is the distance along the first axis of the point ($X_R$, $Z_R$) above the second axis.

3. The method of claim 1, wherein $\theta$ is determined by operating on each point ($t_i$, $g_i$) on the traveltime curve, where $t_i$ is the arrival time of the reflected signal associated with the traveltime curve at the receiver location having depth ($-g_i$) along the first axis below the second axis, using a nonlinear optimization technique to find $X_I$ and $Z_I$, using the distance formula in cartesian coordinates between the image source position ($X_I$, $Z_I$) and an arbitrary receiver position ($z_{gi}$) for every point on the traveltime curve.

4. A method for processing seismic data received at a number of approximately colinear acoustic receiver locations separated from each other along a first axis in a first plane, where the seismic signals associated with the data have originated at a seismic source located in the first plane and offset from the first axis by a distance S along a second axis, where the second axis lies in the first plane, is perpendicular to the first axis, and intersects the source location, including the steps of:

(a) identifying a traveltime curve associated with a subterranean plane reflector from the data;

(b) determining the dip angle, $\theta$, of the reflector using the relationship:

$$\theta=\arctan((X_I-S)/Z_I)$$

where $$Z_I=((t_a^2-t_b^2)v^2-(g_a^2-g_b^2))/(-2(g_a-g_b)),$$

and $$X_I=(t_a^2v^2-(Z_I-g_a)^2)^{\frac{1}{2}},$$

with $t_a$=arrival time at a first receiver location of the reflected signal associated with the traveltime curve, $g_a$=distance along the first axis of the first receiver location above the second axis, $t_b$=arrival time at a second receiver location of the reflected signal associated with the traveltime curve, $g_b$=distance along the first axis of the second receiver location above the second axis, and v=velocity of the reflected signal associated with the traveltime curve; and (c) determining the distance P, along the first axis above the second axis, of the point of intersection of the plane defined by the reflector and the first axis, using the relationship $$P = [(g_d - S\tan\theta)/2] + [(\tfrac{1}{2}\cos\theta)\cdot(-S^2\cos^2\theta +$$
$$Sg_d\sin\theta)(4\cos\theta - \sin\theta) + t_d^2 v^2 - g_d\sin^2\theta)^{\frac{1}{2}}], \text{ where}$$

$t_d$=the arrival time at a receiver location of the reflected signal associated with the traveltime curve, and $g_d$=the distance along the first axis, of the receiver location associated with $t_d$, above the second axis.

5. The method of claim 4, also including the step of: determining the position ($X_R$, $Z_R$) of the point on the reflector associated with the reflected signal received at the receiver location having depth ($-g_3$) along the first axis below the second axis, from the following relationships:

$$X_R=[(g_3-P)(-P\sin2\theta+S\cos2\theta)]/(g_3-2P-(S/\cos\theta))$$

and $$Z_R=X_R\tan(\theta)+P.$$

where $X_R$ is the distance along the second axis of the point ($X_R$, $Z_R$) from the first axis, and $Z_R$ is the distance along the first axis of the point ($X_R$, $Z_R$) above the second axis.

6. The method of claim 4, wherein $\theta$ is determined by operating on each point ($t_i$, $g_i$) on the traveltime curve, where $t_i$ is the arrival time of the reflected signal associated with the traveltime curve at the receiver location having depth ($-g_i$) along the first axis below the second axis, using a nonlinear optimization technique to find $X_I$ and $Z_I$, using the distance formula in cartesian coordinates between the image source position ($X_I$, $Z_I$) and an arbitrary receiver position ($z_{gi}$) for every point on the traveltime curve.

7. A method for processing seismic data received at a number of approximately colinear acoustic receiver locations separated from each other along a first axis in a first plane, where the seismic signals associated with the data have originated at a seismic source located in the first plane and offset from the first axis by a distance S along a second axis, where the second axis lies in the first plane, is perpendicular to the first axis, and intersects the source location, including the steps of:

(a) identifying a traveltime curve associated with a subterranean reflector from the data;

(b) generating a first signal indicative of the dip angle, $\theta$, of the reflector using the relationship $$\theta = \arctan((X_I - S)/Z_I)$$

where $$Z_I = ((t^2_a - t^2_b)v^2 - (g^2_a - g^2_b))/(-2(g_a - g_b)),$$

and $$X_I = (t^2_a v^2 - (Z_I - g_a)^2)^{\frac{1}{2}}$$

with $t_a$ = arrival time at a first receiver location of the reflected signal associated with the traveltime curve, $g_a$ = distance along the first axis of the first receiver location above the second axis, $t_b$ = arrival time at a second receiver location of the reflected signal associated with the traveltime curve, $g_b$ = distance along the first axis of the second receiver location above the second axis, and $v$ = velocity of the reflected signal associated with the traveltime curve; and (c) generating a second signal indicative of the distance P, along the first axis above the second axis, of the point of intersection of the first axis and the plane defined by the reflector, using the relationship $$P = [(g_1 - S\tan\theta)/2] + [(\tfrac{1}{2}\cos\theta) \cdot$$
$$(-S^2\cos^2\theta + Sg_1\sin\theta(4\cos\theta - \sin\theta) +$$
$$t_1^2 v^2 - g_1\sin^2\theta)^{\frac{1}{2}}], \text{ where}$$

$t_1$ = the arrival time at a receiver location of the reflected signal associated with the traveltime curve, and $g_1$ = the distance along the first axis of the receiver location associated with $t_1$, above the second axis.

8. A method for processing seismic data received at a number of approximately colinear acoustic receiver locations separated from each other along a first axis in a first plane, where the seismic signals associated with the data have originated at a seismic source located in the first plane and offset from the first axis by a distance S along a second axis, where the second axis lies in the first plane, is perpendicular to the first axis, and intersects the source location, including the steps of:

(a) identifying a traveltime curve associated with a subterranean reflector from the data;

(b) generating a first signal indicative of the dip angle, $\theta$, of the reflector using the relationship $$\theta = \arctan((X_I - S)/Z_I)$$

where $$Z_I = ((t^2_a - t^2_b)v^2 - (g^2_a - g^2_b))/(-2(g_a - g_b)),$$

and $$X_I = (t^2_a v^2 - (Z_I - g_a)^2)^{\frac{1}{2}}$$

with $t_a$ = arrival time at a first receiver location of the reflected signal associated with the traveltime curve, $g_a$ = distance along the first axis of the first receiver location above the second axis, $t_b$ = arrival time at a second receiver location of the reflected signal associated with the traveltime curve, $g_b$ = distance along the first axis of the second receiver location above the second axis, and $v$ = velocity of the reflected signal associated with the traveltime curve; and (c) generating a second signal indicative of the distance P along the first axis, above the second axis, of the point of intersection of the first axis and the plane defined by the reflector, using the relationship:

$$P = (X_I - S\cos(2\theta))/(-\sin 2\theta).$$

9. A method for processing seismic data received at a number of approximately colinear acoustic receiver locations separated from each other along a first axis in a first plane, where the seismic signals associated with the data have originated at a seismic source located in the first plane and offset from the first axis by a distance S along a second axis, where the second axis lies in the first plane, is perpendicular to the first axis, and intersects the source location, including the steps of:

(a) identifying a traveltime curve associated with a subterranean reflector from the data;

(b) generating a first signal indicative of the dip angle, $\theta$, of the reflector using the relationship $$\theta = \arctan((X_I - S)/Z_I)$$

where $$Z_I = ((t^2_a - t^2_b)v^2 - (g^2_a - g^2_b))/(-2(g_a - g_b)),$$

and $$X_I = (t^2_a v^2 - (Z_I - g_a)^2)^{\frac{1}{2}}$$

with $t_a$ = arrival time at a first receiver location of the reflected signal associated with the traveltime curve, $g_a$ = distance along the first axis of the first receiver location above the second axis, $t_b$ = arrival time at a second receiver location of the reflected signal associated with the traveltime curve, $g_b$ = distance along the first axis of the second receiver location above the second axis, and $v$ = velocity of the reflected signal associated with the traveltime curve; and (c) generating a second signal indicative of the distance P, along the first axis above the second axis, of the point of intersection of the first axis and the plane defined by the reflector, using the relationship:

$$P = (Z_I - S\cos(2\theta))/(1 + \cos(2\theta)).$$

10. The method of claim 7, 8, or 9, also including the step of: (d) generating a third signal indicative of the position $(X_R, Z_R)$ of the point on the reflector associated with the reflected signal received at the receiver location having depth $(-g_3)$ along the first axis below the second axis, from the following relationships:

$$X_R = [(g_3 - P)(-P\sin 2\theta + S\cos 2\theta)]/(g_3 - 2P - (S/\cos\theta))$$

and $$Z_R = X_R \tan(\theta) + P.$$

where $X_R$ is the distance along the second axis of the point $(X_R, Z_R)$ from the first axis, and $Z_R$ is the distance along the first axis of the point $(X_R, Z_R)$ above the second axis.

11. The method of claim 7, 8, or 9, wherein $\theta$ is determined by operating on each point $(t_i, g_i)$ on the traveltime curve, where $t_i$ is the arrival time of the reflected signal associated with the traveltime curve at the receiver location having depth $(-g_i)$ along the first axis below the second axis, using a nonlinear optimization technique to find $X_I$ and $Z_I$, using the distance formula in cartesian coordinates between the image source position $(X_I, Z_I)$ and an arbitrary receiver position $(z_{g_i})$ for every point on the traveltime curve.

12. A seismic prospecting method, including the steps of:
   (a) operating a seismic source to generate seismic wave energy that will propagate through a subterranean formation and reflect from a subterranean plane reflector;
   (b) detecting seismic wave energy that has originated at the source and propagated through the formation, at each of a number of receiver locations, where the receiver locations are separated from each other along a first axis, and where the source is located in the same plane on the receiver location and is offset from the first axis by a distance S along a second axis intersecting the source location and perpendicular to the first axis;
   (c) recording the detected seismic energy to generate a seismic trace associated with each receiver location;
   (d) identifying a traveltime curve, associated with the reflector, from the seismic traces;
   (e) determining the dip angle, $\theta$, of the reflector using the relationship:

$$\theta = \arctan((X_I - S)/Z_I),$$

where $$Z_I = ((t^2_a - t^2_b)v^2 - (g^2_a - g^2_b))/(-2(g_a - g_b)),$$

and $$X_I = (t^2_a v^2 - (Z_I - g_a)^2)^{\frac{1}{2}},$$

$t_a$ = arrival time at a first receiver location of the reflected signal associated with the traveltime curve, $g_a$ = distance along the first axis of the first receiver location above the second axis, $t_b$ = arrival time at a second receiver location of the reflected signal associated with the traveltime curve, $g_b$ = distance along the first axis of the second receiver location above the second axis, and v = velocity of the reflected signal associated with the traveltime curve; and (f) determining the vertical distance P along the first axis above the second axis, of the point of intersection of the first axis and the plane defined by the reflector, using the relationship:

$$P = [(g_1 - S\tan\theta)/2] + [(\tfrac{1}{2}\cos\theta) \cdot$$

$$(-S^2\cos^2\theta + Sg_1\sin\theta(4\cos\theta - \sin\theta) +$$

$$t_1^2 v^2 - g_1\sin^2\theta)^{\frac{1}{2}}], \text{ where}$$

$t_1$ = the arrival time at a receiver location of the reflected signal associated with the traveltime curve, and $g_1$ = the distance along the first axis, of the receiver location associated with $t_1$, above the second axis.

13. The method of claim 12, also including the step of: determining the position $(X_R, Z_R)$ of the point on the reflector associated with the reflected signal received at the receiver location having depth $(-g_3)$ along the first axis below the second axis from the following relationships:

$$X_R = [(g_3 - P)(-P\sin 2\theta + S\cos 2\theta)]/(g_3 - 2P - (S/\cos\theta))$$

and $$Z_R = X_R \tan(\theta) + P,$$

where $X_R$ is the distance along the second axis of the point $(X_R, Z_R)$ along the horizontal axis from the first axis, and $Z_R$ is the distance along the first axis of the point $(X_R, Z_R)$ above the second axis.

14. The method of claim 12, wherein $\theta$ is determined by operating on each point $(t_i, g_i)$ on the traveltime curve, where $t_i$ is the arrival time of the reflected signal associated with the traveltime curve at the receiver location having depth $(g_i)$ along the first axis below the second axis, using a nonlinear optimization technique to find $X_I$ and $Z_I$, using the distance formula in cartesian coordinates between the image source position $(X_I, Z_I)$ and an arbitrary receiver position $(0, z_{g_i})$ for every point on the traveltime curve.

* * * * *